G. R. KEENE.
LOIN HOLDER AND THE LIKE.
APPLICATION FILED AUG. 4, 1919.

1,367,398.

Patented Feb. 1, 1921.
3 SHEETS—SHEET 1.

Witness:
Harry S. Gaither

Inventor:
George R. Keene

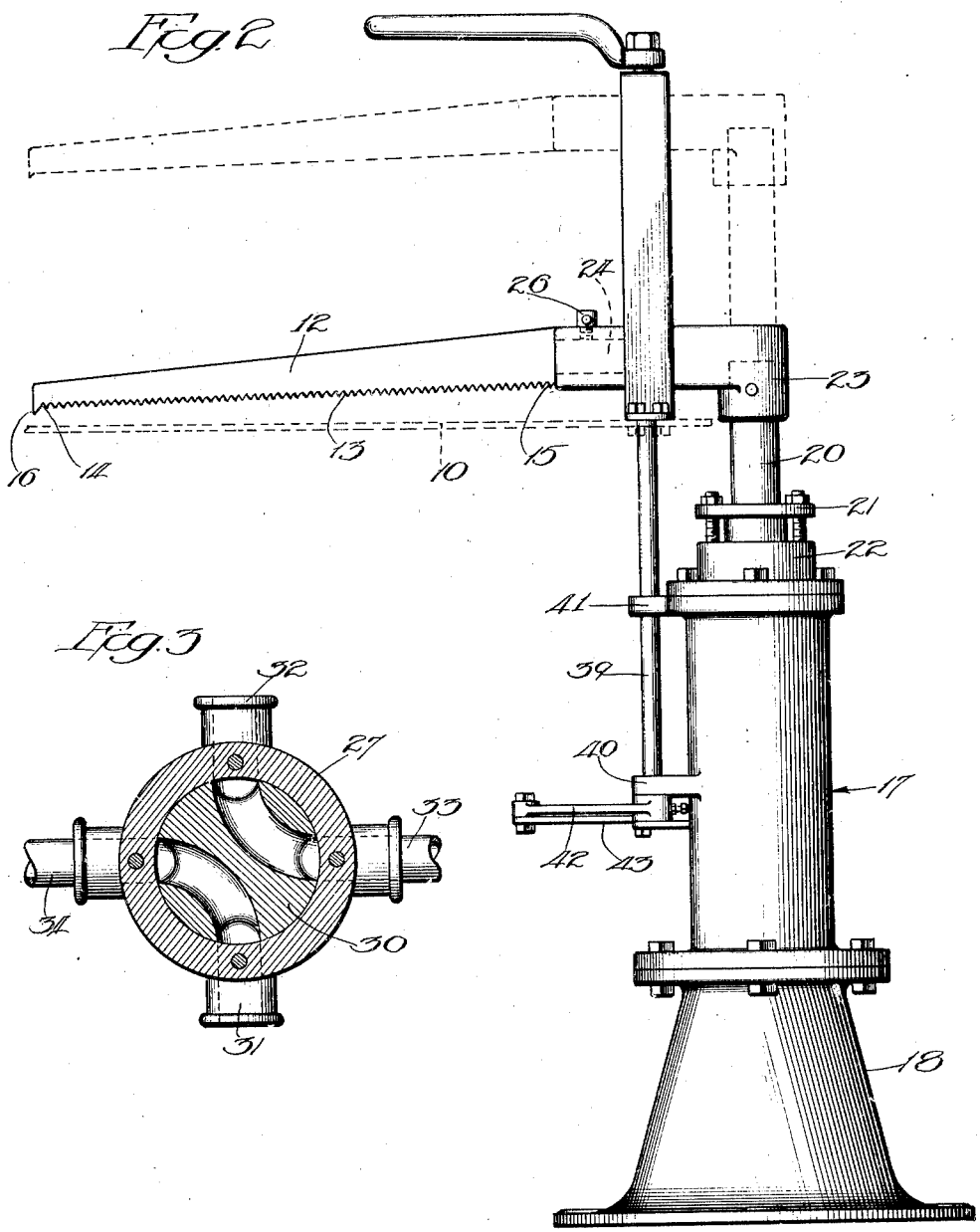

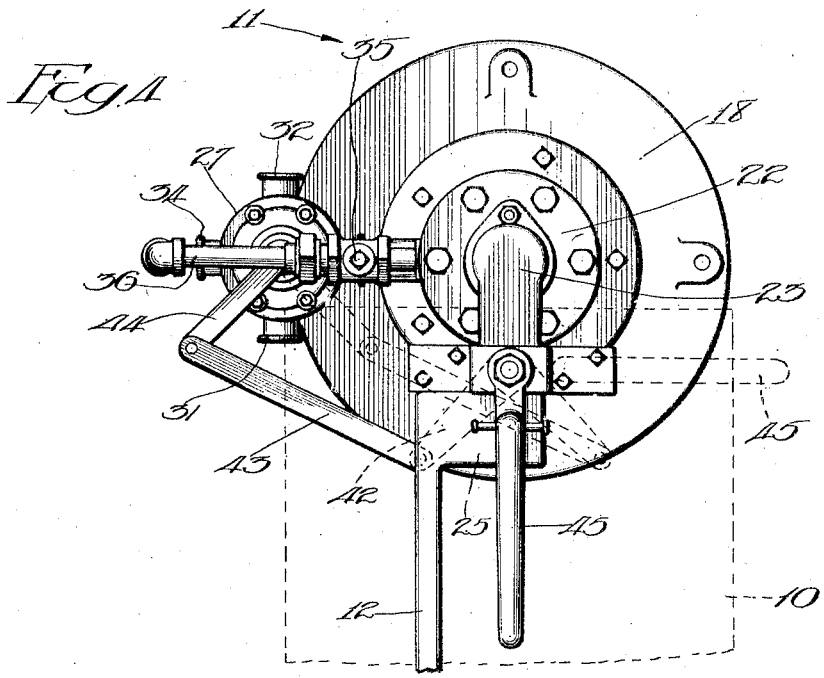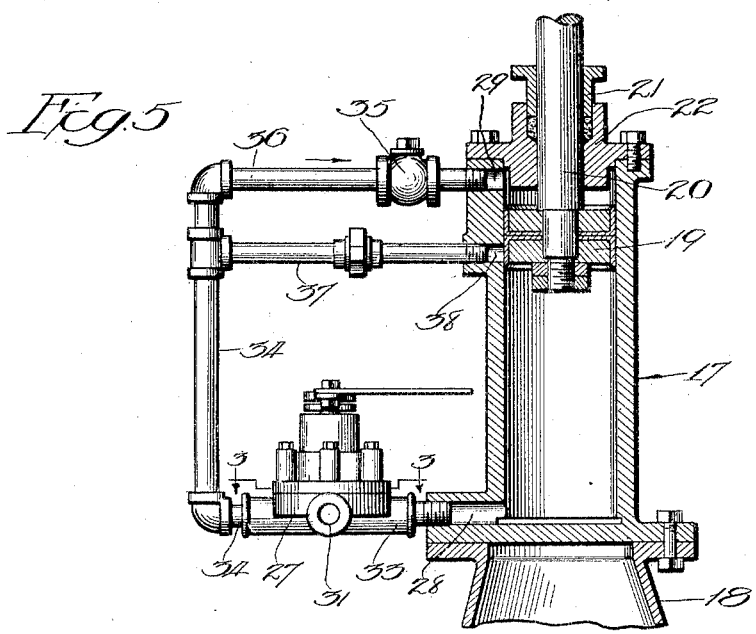

UNITED STATES PATENT OFFICE.

GEORGE R. KEENE, OF CHICAGO, ILLINOIS, ASSIGNOR TO MECHANICAL MANUFACTURING COMPANY, OF CHICAGO, ILLINOIS, A CORPORATION OF ILLINOIS.

LOIN-HOLDER AND THE LIKE.

1,367,398.      Specification of Letters Patent.      Patented Feb. 1, 1921.

Application filed August 4, 1919. Serial No. 315,350.

*To all whom it may concern:*

Be it known that I, GEORGE R. KEENE, a citizen of the United States, residing at Chicago, in the county of Cook and State of Illinois, have invented certain new and useful Improvements in Loin-Holders and the like, of which the following is a specification.

The present invention has to do with improvements in loin holders; that is, machines which are used in connection with meat cutting operations in which the loins are removed from the carcass. The features of the invention are very well adapted for use in holding the carcasses of hogs while the loins are being stripped therefrom, but it will be understood that the invention is in nowise limited except as the same is limited in the claims. In order that the features of the invention may be more thoroughly and clearly understood, I will first explain briefly the nature of the cutting operations in connection with which the machine is intended to be used. In this connection, it may be stated that the carcass is opened out and laid flat on its back on a table in which position it must be securely held while a stripping knife or other suitable tool is drawn through the exposed portion of the carcass to cut away the loins or other sections sought to be removed. During this cutting operation, the operator needs the use of both hands for properly holding the draw knife, and, therefore, the machine itself must be so constructed that it will properly hold the carcass while leaving both hands of the operator free for the cutting operation. After the cutting operation has been completed, the carcass is thrown back over the rear of the table into a basket or conveyer by which it is removed to another point for other treatment. The loin holder, in order to most successfully perform its function, should be so constructed that the carcass can be thrown back in this way without interference or obstruction by the mechanism of the holder itself.

One of the objects of the present invention is to provide a holding mechanism so constructed that the carcass will be securely held while leaving both hands of the operator free for the cutting operation, said mechanism being so constructed that after the cutting operation is completed the carcass can be easily thrown back out of the way without obstruction from the machine itself.

Another object of the invention is to provide a device of this kind so arranged that it can be operated by pneumatic pressure. In this connection still another object is to so arrange the mechanism that the holding device or arm may be either raised or lowered pneumatically by the use of very simple control arms.

Still another object in this connection is to so construct the machine that the movements of the pistons or plunger will be properly cushioned, thereby removing danger of injuring the machine by shock or jar at its extreme positions of movement.

Other objects and uses of the invention will appear from a detailed description of the same which consists in the features of construction and combinations of parts hereinafter described and claimed.

In the drawings:

Fig. 2 shows a view at right angles to Fig. 1, the surface of the table being shown by the dotted lines, and the raised position of the holding arm being also shown by the dotted lines;

Fig. 3 shows a horizontal detail section through a simple type of control valve;

Fig. 4 shows a plan view of the mechanism of Figs. 1 and 2; and

Fig. 5 shows a vertical section through the piston, plunger and ports.

Figure 1:
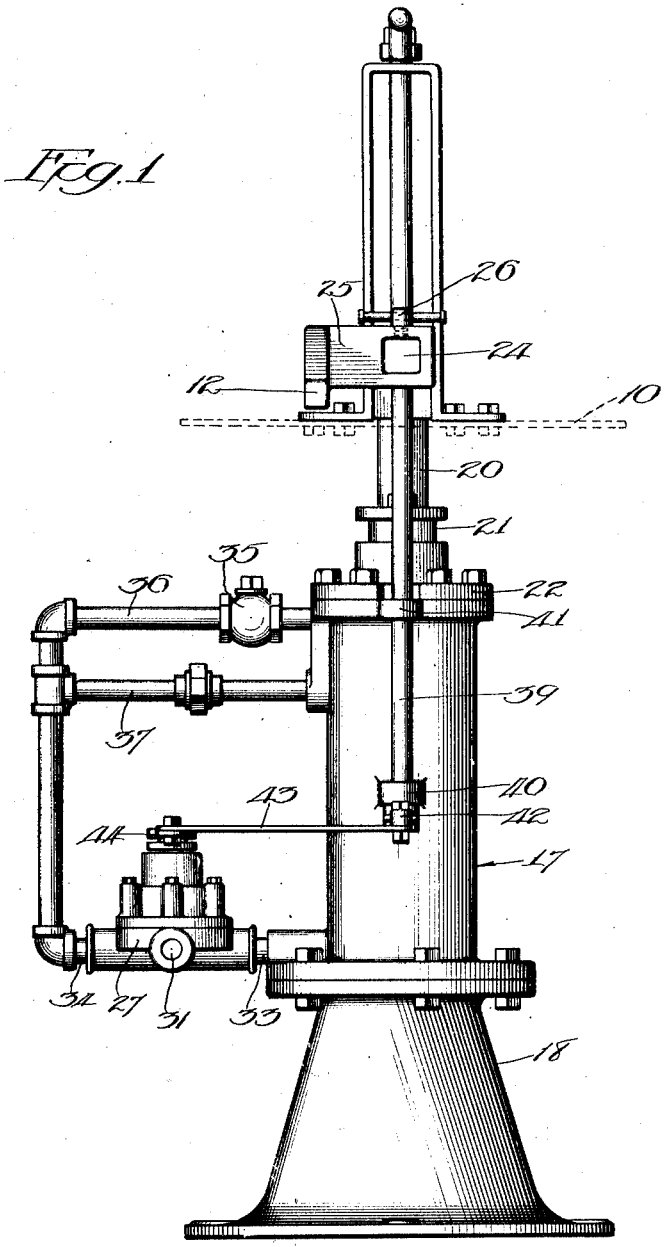
Figure 1 shows a front elevation of the machine with the loin holding arm in its lowered position, the surface of the table being shown by dotted lines.

Referring first to Figs. 2 and 4, I will explain that the carcass is laid out for the cutting operation on the table 10. The operator occupies a position at the front end of said table viewed as in Fig. 4, so that the loin holding mechanism is in front of him. After the cutting operation is completed, the remainder of the carcass is thrown over substantially to the point shown by the numeral 11 in Fig. 4 where it passes either to another machine or to a conveyer.

The loin holder includes an elongated arm 12 whose lower edge or surface 13 is preferably corrugated or toothed, as shown in Fig. 2, so as to hold the carcass in the most advantageous manner. The front end 14 of said arm lies closer to the surface of the table than its rear end 15, and a tooth or point 16 on said front end insures a very perfect engagement with the material of the loin.

The arm 12 is raised and lowered pneumatically at its rear end, and by relating the arm to the table in the manner just explained, assurance is had that the arm will come into solid engagement with the loin at all portions of its length.

A fluid operated cylinder 17 stands in a vertical position and on a base 18 near the rear end of the table. Within this cylinder is a plunger 19 to which is connected the lower end of a piston rod 20. Said piston rod works through a stuffing box 21 in the upper cylinder head 22, and at its upper end said piston rod carries a block 23 of the form shown in Figs. 1, 2, and 4. The front end 24 of said block is preferably squared and enters a suitable opening in the lug 25 on the rear end of the arm 12. A set screw 26 is provided for locking the lug 25 onto the squared arm 24. It will be observed that by this arrangement the holding arm 12 is located or set to one side of the center line of the machine so as to give a greater clearance on one side of the loin than on the other.

The plunger 19 is fluid operated, and ordinarily air will be used for this purpose, but manifestly any suitable fluid may be substituted therefor. A control valve 27 serves to deliver the operating fluid either through the port 28 against the under surface of the plunger, or through the port 29 against its upper surface. Said valve 27 includes a rotatable block 30, an air inlet connection 31, an air exhaust connection 32, and other connections 33 and 34 leading respectively to the ports 28 and 29. With the plug in the position shown in Fig. 3, air is being delivered from the connection 31 through the port 29 against the upper surface of the plunger 19, and with the plug turned through a distance of 90 degrees in a clockwise direction, the air will be delivered through the connection 33 and port 28 to the under surface of the plunger, while at the same time permitting air to exhaust from the upper surface of the plunger through the connection 32.

It will be observed that the downward movement of the plunger 19 will be cushioned by the engagement of the arm 12 with the material of the carcass, so that there is practically no danger of damaging the machine by sudden impact of the plunger 19 against the bottom head of the cylinder. On the other hand, when the plunger is raised by the admission of compressed air against its under surface, there might be serious damage occasioned by the sudden arresting of its movement upon engagement with the upper cylinder head 22. I have, therefore, provided a construction such that the upward movement of the piston will be automatically cushioned. For this purpose, I have placed a check valve 35 in the pipe 36 leading to the port 29, which check valve permits air to enter the cylinder through said port in the direction of the arrow adjacent the pipe 36 in Fig. 5, but prevents a back flow of air on the upward movement of the plunger. Another connection 37 leads from the supplemental port 38 in the cylinder wall to the pipe 34 coming from the control valve. With this arrangement the air necessary to force the plunger down comes in the first place from the pipe 36 through the check valve 35 and port 29, and after the plunger has descended far enough to uncover the port 38, air may also enter the cylinder from the pipe 37 through said port. On the up movement of the plunger air exhausting from the upper surface of the plunger passes out through the port 38 and pipe 37 but is prevented from passing out through the port 39 by the presence of the check valve 35. Therefore, as soon as the plunger covers the port 38, a certain amount of air will be trapped in the upper end of the cylinder and will cushion the further movement of the plunger.

I have provided an arm or the like for controlling the operations of the valve in such a manner that they can be very easily manipulated by the operator in conjunction with the operations of stripping the loin. For this purpose a rod 39 is pivoted in the brackets 40 and 41 in a vertical position. The lower end of said rod carries an arm 42 which connects by means of a link 43 to an arm 44 on the valve plug 30. The upper end of the rod 39 is connected to a control arm 45 which may occupy either the full or the dotted line positions of Fig. 4. When said arm is in the full line position, the air is admitted to the upper face of the plunger so as to force the same down, whereas when the plunger 45 is thrown over into the right angle position, the operations are reversed.

While I have herein shown and described only a single embodiment of the features of my invention, still I wish it clearly understood that I do not limit myself to the said embodiment, except as I may do so in the claims.

I claim:

1. In a machine of the class described, the combination of a vertical double acting pneumatic cylinder, a plunger vertically movable therein, a piston rod connected to said plunger and working through the upper end of the cylinder, there being air ports adjacent to the upper and lower ends of the cylinder, and a third air port below the upper end of the cylinder, air connections to all of said ports, a check valve in the air connection to the upper port permitting the entrance of air therethrough into the cylinder and preventing the discharge of air therefrom, a horizontal arm connected to the upper end of the piston rod, and a valve for admitting air either to the lower port while exhausting from the third mentioned port, or for admitting air to the two uppermost ports while exhausting air from the bottom port, substantially as described.

2. In a machine of the class described, the combination of a vertical double acting pneumatic cylinder, a plunger vertically movable therein, a piston rod connected to said plunger, a horizontal arm connected to the upper end of the piston rod, air ports adjacent to the upper and lower ends of the cylinder, a third air port below the upper end of the cylinder, connections to all of said ports, a check valve in the uppermost connection permitting the flow of air into the cylinder while preventing the discharge of air therefrom, and a valve for controlling the flow of air to and from the various connections, substantially as described.

3. In a machine of the class described the combination of a vertically movable member, a block on the upper end of said member having a horizontally extending square opening, and a loin engaging arm in conjunction with the aforesaid block, said arm having a horizontally extending portion and an end portion offset to one side thereof, said offset portion being square and adapted to enter into and engage the aforesaid square opening, substantially as described.

4. In a machine of the class described the combination of a vertically movable member, a block on said member, and a loin engaging arm in conjunction with said block, said arm having an elongated loin engaging portion lying in horizontal direction, and an offset end portion offset in a horizontal plane and adapted to engage the block on the member substantially as described.

5. In a machine of the class described, the combination of a vertically movable member, and a loin engaging arm in conjunction with said member, said loin engaging arm having an elongated loin engaging portion and an offset end portion removably connected to the member, substantially as described.

GEORGE R. KEENE.